US008724604B2

(12) United States Patent
Yang

(10) Patent No.: US 8,724,604 B2
(45) Date of Patent: May 13, 2014

(54) WIRELESS ROUTER, WIRELESS ROUTING METHOD, AND WIRELESS ROUTING SYSTEM

(75) Inventor: Jianping Yang, Beijing (CN)

(73) Assignee: Huawei Device Co., Ltd., Shenzhen (CN)

( * ) Notice: Subject to any disclaimer, the term of this patent is extended or adjusted under 35 U.S.C. 154(b) by 186 days.

(21) Appl. No.: 13/117,318

(22) Filed: May 27, 2011

(65) Prior Publication Data

US 2011/0292922 A1 Dec. 1, 2011

(30) Foreign Application Priority Data

May 27, 2010 (CN) .......................... 2010 1 0187729

(51) Int. Cl.
*H04W 4/00* (2009.01)
(52) U.S. Cl.
USPC ........................................................ 370/338
(58) Field of Classification Search
None
See application file for complete search history.

(56) References Cited

U.S. PATENT DOCUMENTS

| 6,961,573 | B1 * | 11/2005 | Moon et al. ................. 455/445 |
| 7,039,027 | B2 * | 5/2006 | Bridgelall ..................... 370/329 |
| 2006/0114883 | A1 | 6/2006 | Mehta et al. |
| 2007/0110017 | A1 * | 5/2007 | Fulknier et al. .............. 370/338 |
| 2007/0115942 | A1 | 5/2007 | Money et al. |
| 2007/0249316 | A1 | 10/2007 | Rao |
| 2008/0101266 | A1 * | 5/2008 | Dahlstedt et al. ............. 370/310 |
| 2008/0259890 | A1 * | 10/2008 | Thermond ..................... 370/338 |
| 2010/0008218 | A1 | 1/2010 | Dumov et al. |

FOREIGN PATENT DOCUMENTS

| CN | 1783829 A | 6/2006 |
| CN | 101340345 A | 1/2009 |
| CN | 201467472 U | 5/2010 |
| CN | 101854740 A | 10/2010 |
| JP | 2007-266834 | 10/2007 |
| JP | 2008-54145 | 3/2008 |
| JP | 2010-021878 | 1/2010 |
| WO | WO 2006/119573 A1 | 11/2006 |
| WO | WO 2011/147325 A1 | 12/2011 |

OTHER PUBLICATIONS

Second Chinese Office Action (Partial Translation) dated (mailed) May 14, 2012, issued in related Chinese Application No. 201010187729.6 Huawei Technologies Co., LTD (14 pgs.).

(Continued)

*Primary Examiner* — Yong Zhou

(57) ABSTRACT

A wireless router is provided, which includes: a wireless Access Point (AP) module, connected to a terminal equipment through a wireless link, and configured to implement wireless access of the terminal equipment; a station (STA) module, connected to a wireless AP in a fixed network through a wireless link, and configured to connect the terminal equipment to the Internet by using the wireless AP in a fixed network; and a wireless modem module, connected to an access device in a mobile network through a wireless link, and configured to connect the terminal equipment to the Internet by using the access device in a mobile network. According to the technical solutions, a Wireless Local Area Network (WLAN) STA module, an AP module, and a wireless modem chip construct a wireless router to provide not only an AP function but also an STA function. The terminal equipment may be connected to the wireless router, and selects a fixed network hot spot or a wireless modem to access the Internet.

6 Claims, 3 Drawing Sheets

(56) References Cited

OTHER PUBLICATIONS

International Search Report for International Application No. PCT/CN2011/074765, mailed Sep. 1, 2011, Huawei Technologies Co., LTD.

Extended European Search Report dated (mailed) Nov. 4, 2011, issued in related Application No. 11167883.5-1525, Hauwei Technologies Co., Ltd.

First Chinese Office Action dated (mailed) Sep. 26, 2011, issued in related Chinese Application No. 201010187729.6 Huawei Technologies Co., LTD.

Partial Translation of Second Chinese Office Action in connection with Chinese Application No. 201010187729.6, Nov. 5, 2012, 13 pages.

Written Opinion of International Searching Authority dated Aug. 22, 2012 in connection with International Patent Application No. PCT/CN2011/074765, 5 pages.

Translation of Japanese Office Action in connection with Japanese Application No. 2011-119371, Nov. 27, 2012, 5 pages.

Decision of Refusal dated Apr. 16, 2013 in connection with Japanese Patent Application No. 2011-119371.

* cited by examiner

WIRELESS ROUTER, WIRELESS ROUTING METHOD, AND WIRELESS ROUTING SYSTEM

CROSS-REFERENCE TO RELATED APPLICATION

This application claims priority to Chinese Patent Application No. 201010187729.6, filed on May 27, 2010, which is hereby incorporated by reference in its entirety.

FIELD OF THE INVENTION

The present invention relates to the field of communications technologies, and in particular, to a wireless router, a wireless routing method, and a wireless routing system.

BACKGROUND OF THE INVENTION

As a Wireless Local Area Network (WLAN) is widely applied, increasingly more shared network device used in homes, in public places, or by individuals adopts the wireless access technology. Generally, a fixed network operator connects the Internet to a fixed location in a wired manner, and then forms an Access Point (AP) device by using the WLAN. A personal terminal obtains an Internet service by connecting to a wireless AP. A mobile operator integrates a wireless AP by using 2G/3G/Long Term Evolution (LTE)/World Interoperability for Microwave Access (Wimax) broadband modems, so as to provide network access services for other users.

All of the terminal products need to rely on mobile networks and fixed networks, but coverage of fixed network hot spots and mobile network hot spots may not be quite comprehensive. A place having a fixed network hot spot may not have a mobile network, and vice versa. Therefore, neither a single fixed network terminal nor a single mobile terminal can satisfy a demand that the user accesses the Internet anywhere and anytime.

In addition, because the fee of a mobile network is excessively high, a user hopes that a WLAN AP is used for access to reduce the fee if a fixed network exists, and the mobile network is only used for network access if no fixed network exists. Therefore, an integrated terminal is required to satisfy the demand of the user.

SUMMARY OF THE INVENTION

The embodiments of the present invention provide a wireless router, a wireless routing method, and a wireless routing system, so as to solve a problem in the conventional art that a network access manner cannot be flexibly selected.

In one aspect, an embodiment of the present invention provides a wireless router, where the wireless router includes: a wireless AP module, connected to terminal equipment through a wireless link, and configured to implement wireless access of the terminal equipment; a station (STA) module, connected to a wireless AP in a fixed network through a wireless link, and configured to connect the terminal equipment to the Internet by using the wireless AP in a fixed network; and a wireless modem module, connected to an access device in a mobile network through a wireless link, and configured to connect the terminal equipment to the Internet by using the access device in a mobile network.

In another aspect, an embodiment of the present invention also provides a wireless routing method, where the method includes: connecting terminal equipment through a wireless link, and providing a wireless access service for the terminal equipment; connecting a wireless AP in a fixed network through a wireless link, and connecting an access device in a mobile network through a wireless link; and selecting one of the wireless AP in a fixed network and the access device in a mobile network to connect the terminal equipment to the Internet.

In still another aspect, an embodiment of the present invention further provides a wireless routing system, where the system includes: a terminal equipment, a wireless router, a wireless AP in a fixed network, and an access device in a mobile network, in which the wireless AP in a fixed network is connected to the wireless router through a wireless link; the wireless router is connected to the wireless AP in a fixed network and the access device in a mobile network through a wireless link; and the wireless router is connected to the terminal equipment through a wireless link, for providing a wireless access service for the terminal equipment; and configured to connect the terminal equipment to the Internet by using the wireless AP in a fixed network, or connect the terminal equipment to the Internet by using the access device in a mobile network.

In the wireless router, the wireless routing method, and the wireless routing system according to the embodiments of the present invention, a WLAN STA module, an AP module, and a wireless modem chip construct a wireless router to provide not only an AP function but also an STA function. Other terminal equipments may be connected to the wireless router of the present invention, and select a fixed network hot spot or a wireless modem to access Internet. The technical solutions solve the problem that the user cannot access the network by flexibly selecting the AP method or the wireless modem dial-up method by using the wireless router. When a fixed network hot spot exists, the user may preferably select the fixed network hot spot to access the network by dial-up, thereby reducing a user fee, and extending a use range of a mobile router.

DETAILED DESCRIPTION OF THE EMBODIMENTS

To make the objectives, technical solutions, and advantages of embodiments of the present invention more comprehensible, the technical solutions of the embodiments of the present invention is clearly described in the following with reference to the accompanying drawings according to the embodiments of the present invention. It is obvious that the embodiments to be described are only a part rather than all of the embodiments of the present invention. All other embodiments obtained by persons skilled in the art based on the embodiments of the present invention without creative efforts shall fall within the protection scope of the present invention.

In the accompanying drawings according to the embodiments of the present invention, a wireless router is a device according to an embodiment of the present invention, a Personal Digital Assistant (PDA) and a notebook computer are user terminals, a wireless AP in a fixed network is a hot spot provided by a fixed network operator, and a base station refers to equipment provided by a mobile operator.

Figure 1:
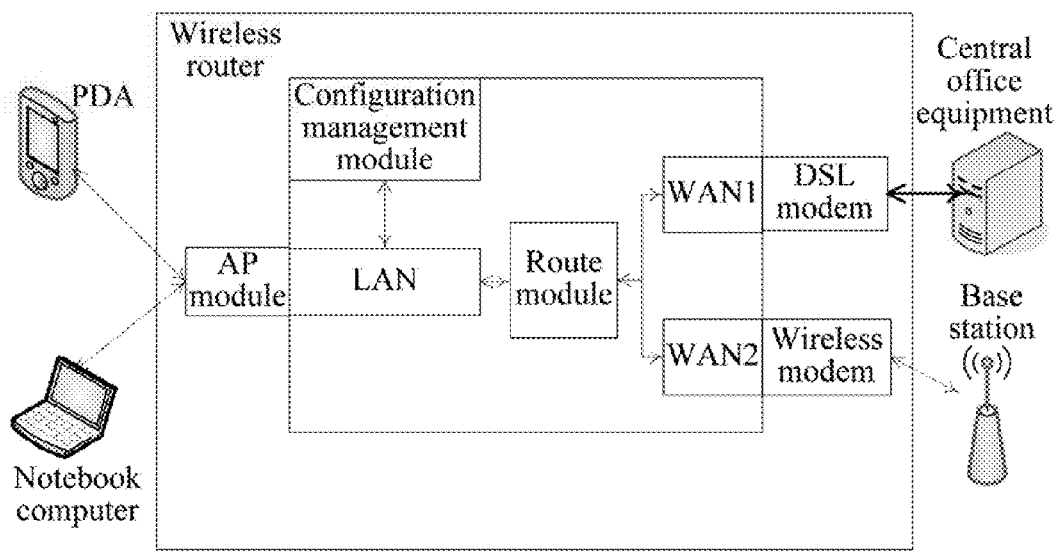
FIG. 1 is a schematic diagram of a wireless routing system according to an embodiment of the present invention.

FIG. 1 is a schematic diagram of a wireless routing system according to an embodiment of the present invention. A wireless router in FIG. 1 may be connected to a fixed network and a mobile network at the same time, and the wireless router is connected to the fixed network in a wired manner, such as by using a Digital Subscriber Line (DSL), and is connected to a wireless network by using a modem module. The wireless router acts as a WLAN AP to provide Internet access services, and a WLAN user terminal such as a notebook computer or a game device, may access the Internet by using the terminal.

Principles of access Internet by using the system shown in FIG. 1 are as follows:

Firstly, an AP module of the wireless router provides a hot spot service. When a terminal, such as a PDA and a notebook computer, is to access the network, the terminal is firstly connected to the AP module. Specifically, the terminal, such as the PDA and the notebook computer, acts as an STA, and is connected to the AP module by using existing WLAN technologies; and an interface of the AP module in the wireless router is a Local Area Network (LAN) interface, and an IP data packet of the PDA is sent to the LAN interface.

Then, a user terminal selects a Wide Area Network (WAN) interface WAN1 or WAN2 to connect to the Internet by using a configuration management module, in which the WAN1 is an interface between a DSL modem and central office equipment, and the WAN2 is an interface between a wireless modem and a base station. Specifically, the user terminal is connected to the configuration management module by using a browser, and then the user terminal selects the WAN1 or the WAN2 to connect to the Internet by clicking a menu provided on a website.

Finally, when selecting the WAN1 to connect to the Internet, a user accesses a network by dial-up access by using the DSL, that is, in wired manner; and when selecting the WAN2 to connect to the Internet, the user is connected to the Internet in a wireless manner by using a wireless modem module by using dial-up parameters set by the user.

The wireless router in the system shown in FIG. 1 may select a fixed network, such as the DSL, and may be used in a place, so as to select a network access manner with a lower fee.

Figure 2:
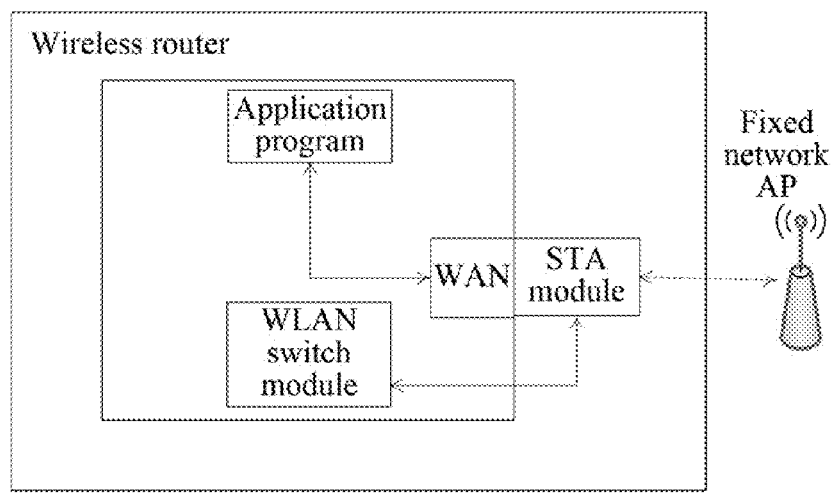
FIG. 2 is a schematic diagram of another wireless routing system in a first work mode according to an embodiment of the present invention.
Figure 3:
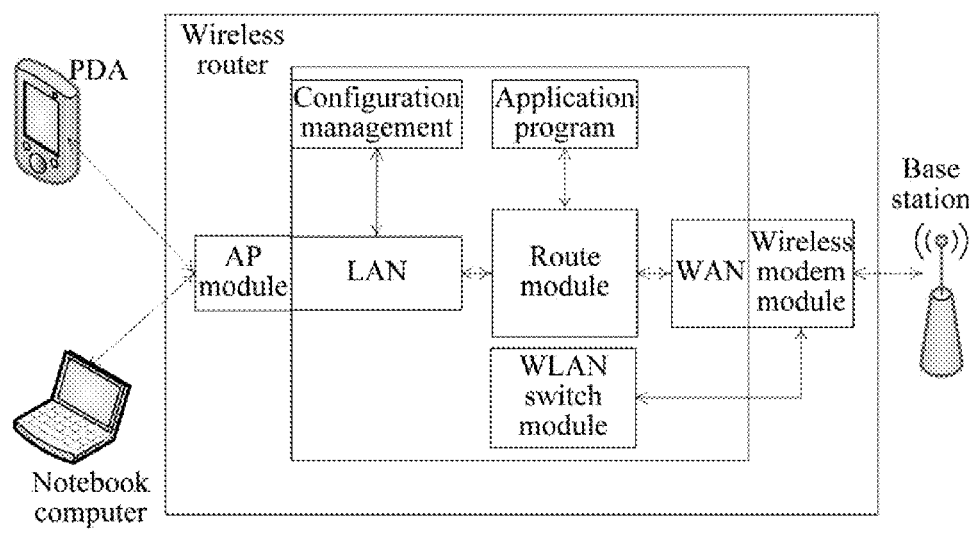
FIG. 3 is a schematic diagram of another wireless routing system a second work mode according to an embodiment of the present invention.

FIG. 2 and FIG. 3 are schematic diagrams of two work modes of another wireless routing system according to an embodiment of the present invention. The wireless router may be a WLAN chip integrated in an intelligent mobile phone. The WALN chip may support an STA mode or an AP mode. During the use of the wireless router, WLAN work modes are switched by running user commands. When the STA mode is used, a hot spot provided by a fixed network may be found and is adopted to access the Internet; and when no hot spot exists, a modem may be adopted to access the network by dial-up.

FIG. 2 is a schematic diagram of the STA mode of the system. As shown in FIG. 2, when the wireless router is switched to the STA mode, an application module is connected to a WAN interface, and is connected to an external AP by using an STA module, thereby implementing a network access function. However, the wireless router cannot be connected to other terminal equipments in a downlink direction to provide a network access function for other terminal equipments. In such case, only application programs of the wireless router may access the network.

FIG. 3 is a schematic diagram of the AP mode of the system. As shown in FIG. 3, when the wireless router is switched to the AP mode, a terminal equipment, such as a PDA and a notebook computer, is connected to an LAN interface of the wireless router by using an AP module, and the terminal equipment sends data to a WAN by using a route module, and implements a network access function by wireless modem dial-up. An application program of the wireless router also accesses the network from a WAN interface by using a route module.

The AP module and the STA module of the WLAN chip of the system shown in FIG. 2 and FIG. 3 cannot work at the same time. When being switched to the STA mode, the WLAN chip may access the network by using a wireless AP in a fixed network with a lower fee, but cannot be connected to a digital device, such as the PDA and the notebook computer, to provide a network access function for other devices. In such case, only an application program of the WLAN chip may access the network. When switched to the AP mode, the WLAN chip may provide the network access function for other devices, but can only access the network by using a wireless access method with a higher fee, and cannot access the network by using a wireless AP in a fixed network with a lower fee.

Figure 4:
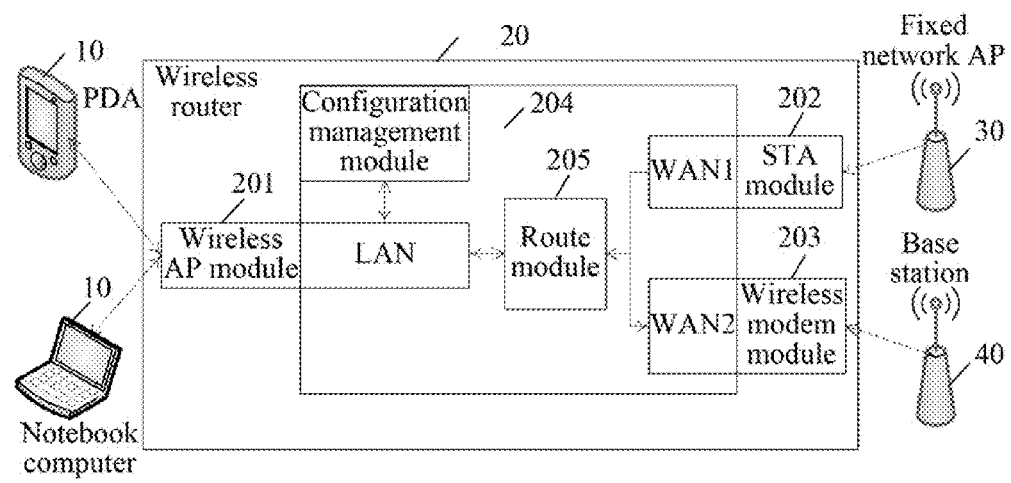
FIG. 4 is a schematic diagram of a wireless routing system according to an embodiment of the present invention.

An embodiment of the present invention provides a wireless routing system. FIG. 4 is a schematic diagram of a wireless routing system according to the embodiment of the present invention. As shown in FIG. 4, the wireless routing system according to the embodiment includes: a terminal equipment 10, a wireless router 20, a wireless AP in a fixed network 30, and an access device in a mobile network 40. The terminal equipment 10 is connected to the wireless router 20 through a wireless link; and the wireless router 20 is connected to the wireless AP in a fixed network 30 and the access device in a mobile network 40 through a wireless link.

In this embodiment, the wireless router 20 is configured to connect to the terminal equipment through a wireless link, for providing a wireless access service for the terminal equipment; and connect the terminal equipment to the Internet by using the wireless AP in a fixed network, or connect the terminal equipment to the Internet by using the access device in a mobile network.

Alternatively, in this embodiment, the terminal equipment 10 is configured to send a routing instruction to the wireless router 20. The routing instruction is used to indicate that the terminal equipment is connected to the Internet by using an STA module or a wireless modem module. Alternatively, the terminal equipment 10 in this embodiment sends the routing instruction to a configuration management module of the wireless router 20 by using a Hypertext Transfer Protocol (HTTP), but the present invention is not limited thereto. The wireless router 20 in this embodiment is configured to receive the routing instruction of the terminal equipment, and select the STA module or the wireless modem module to connect the terminal equipment to the Internet.

Alternatively, the wireless router 20 of this embodiment may also be configured to receive a packet from the terminal equipment 10 or the Internet, and route the packet from the terminal equipment 10 to the Internet or route the packet from Internet to the terminal equipment 10 according to a destination address of the packet.

In the system according to the embodiment of the present invention, a WLAN STA chip, an AP module, and a wireless modem chip construct a wireless router to provide not only an AP function but also an STA function. Other terminal equipments may be connected to the wireless router of the embodiment, and select a hot spot in a fixed network or a wireless modem to access the Internet. The system solves the problem that the user cannot access the network by flexibly selecting the AP method or the wireless modem dial-up method by using the wireless router. When a hot spot in a fixed network exists, the user may select the hot spot to access the network by dial-up, thereby reducing a user fee, and extending a use range of a mobile router.

An embodiment of the present invention further provides a wireless router. As shown in FIG. 4, the wireless router 20 according to the embodiment of the present invention includes: a wireless AP module 201, connected to a terminal equipment through a wireless link, and configured to implement wireless access of the terminal equipment; an STA module 202, connected to wireless AP in a fixed network through a wireless link, and configured to connect the terminal equipment to the Internet by using the wireless AP in a fixed network; and a wireless modem module 203, connected to an access device in a mobile network through a wireless link, and configured to connect the terminal equipment to the Internet by using the access device in a mobile network. In this embodiment, functions of both the wireless AP module 201 and the STA module 202 may be implemented by using a WLAN chip.

Alternatively, to provide a network access routing function for a user, the wireless router 20 according to the embodiment of the present invention further includes a configuration management module 204, connected to the wireless AP module, and configured to receive a routing instruction of the terminal equipment, and select the STA module or the wireless modem module to connect the terminal equipment to the Internet.

Alternatively, the wireless router 20 according to this embodiment is further configured to preferably select a wireless AP in a fixed network to connect the terminal equipment to the Internet when a fixed network wireless AP exists.

Alternatively, the wireless router 20 according to the embodiment of the present invention further includes a route module 205, configured to receive a packet from the terminal equipment or Internet, and route the packet from the terminal equipment to the Internet or route the packet from Internet to the terminal equipment according to a destination address of the packet. Specifically, the route module performs judgment according to a Media Access Control (MAC) address, and forwards the packet to a local network if a destination MAC address is in an MAC table, sends the packet to an Internet Protocol (IP) layer if a destination MAC address is not in an MAC table; the route module performs judgment according to a destination IP address on the IP layer, and sends the packet to a transmission layer for being processed, if a wireless router is to be visited; or routes the IP data packet to a WAN interface if an external network is to be visited.

Alternatively, the wireless AP module 201 of the wireless router according to the embodiment of the present invention is connected to the terminal equipment by using an LAN interface. The STA module 202 is connected to the wireless AP in a fixed network by using a WAN interface. The wireless modem module 203 is connected to the access device in a mobile network by using a WAN interface.

In the wireless mobile router according to the embodiment of the present invention, two WLAN chips are adopted, one acts as an AP and the other acts as an STA. Therefore, the wireless router may not only act as an AP to provide access services for a local STA, or but also act as an STA to be connected to an AP providing Internet services to implement a network access function, and may select a fixed network hot spot or a wireless modem to access Internet. The wireless router may access the network by flexibly selecting the AP method or the wireless modem dial-up method. When a fixed network hot spot exists, the wireless router may preferably select the fixed network hot spot to access the network by dial-up, thereby reducing a user fee, and extending a use range of a mobile router.

Figure 5:
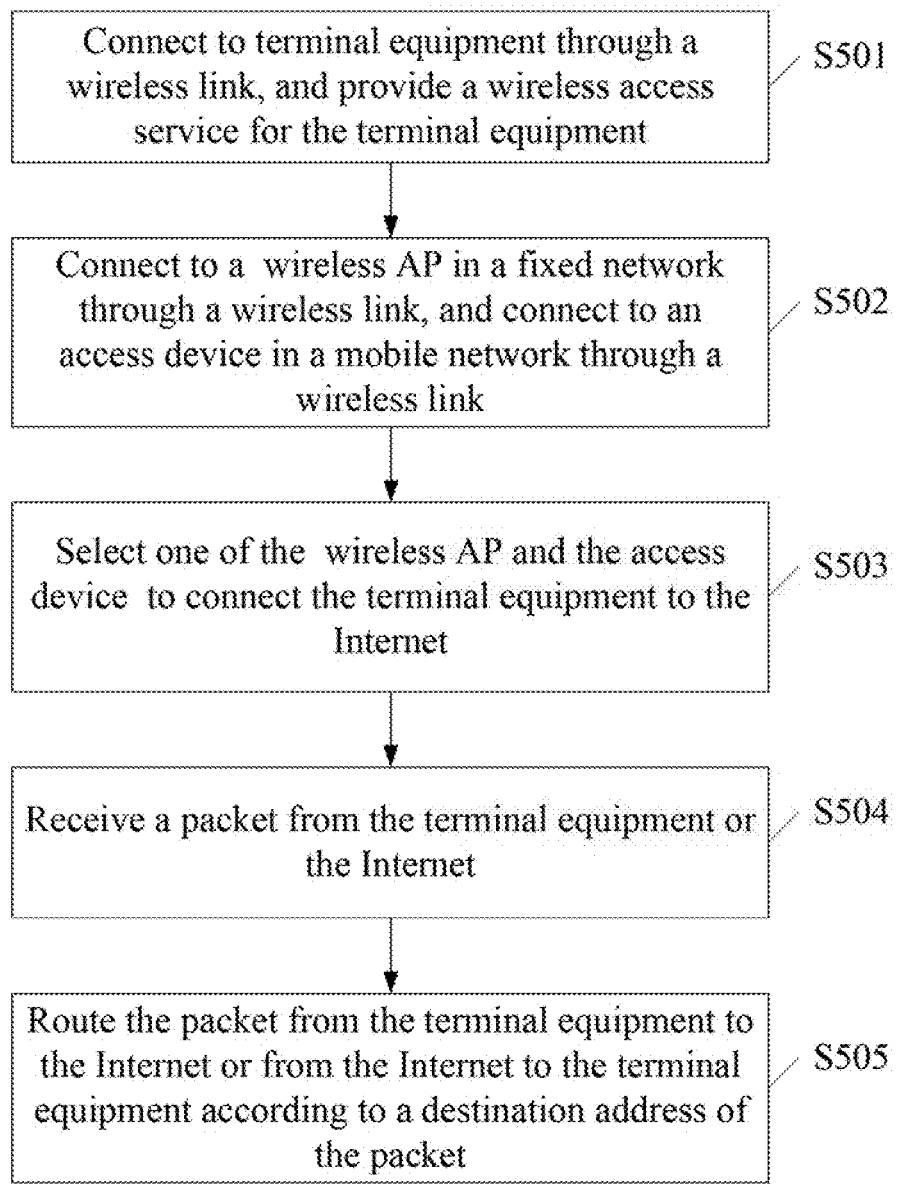
FIG. 5 is an overall flow chart of a wireless routing method according to an embodiment of the present invention.

In an embodiment, the present invention further provides a wireless routing method, the implementation subject of which is the wireless router 20 in the preceding embodiment. FIG. 5 is an overall flow chart of the wireless routing method according to the embodiment of the present invention. As shown in FIG. 5, the method includes the following steps.

Step S501: Connect to a terminal equipment through a wireless link, and provide wireless access for the terminal equipment.

Step S502: Connect to a wireless AP in a fixed network through a wireless link, and connect to an access device in a mobile network through a wireless link.

Step S503: Select one of the wireless AP in a fixed network and the access device in a mobile network to connect the terminal equipment to the Internet.

Alternatively, step S503 may include: receiving a routing instruction of the terminal equipment; and selecting the wireless AP in a fixed network or the access device in a mobile network to connect the terminal equipment to the Internet according to the routing instruction.

Alternatively, step S503 may further include: preferably selecting a wireless AP in a fixed network to connect the terminal equipment to the Internet when the wireless AP exists.

Alternatively, the wireless routing method may further include the following steps.

Step S504: Receive a packet from the terminal equipment or Internet.

Step S505: Route the packet from the terminal equipment to the Internet according to a destination address of the packet or route the packet from Internet to the terminal equipment according to a destination address of the packet.

An example is taken in the following for illustrating the procedure for the wireless routing method according to the embodiment of the present invention in combination with the schematic diagram of the system in FIG. 4.

Step 1: An AP module 201 of a wireless router 20 provides a hot spot service. When access the network, a terminal equipment 10, such as a PDA or a notebook computer of a user, is connected to the AP module 201. An interface of the AP module 201 in the wireless router 20 is an LAN interface. A data packet of the terminal equipment is sent to the LAN interface.

Step 2: Connect a terminal equipment 10 to the wireless router by using the LAN interface, and selects an interface WAN1 or an interface WAN2 to access Internet by using a configuration management module 204.

Step 3: When the user selects the WAN1 to connect to the Internet, an STA module 202 is connected to an appointed AP according to user configuration parameters, and accesses a network of an operator by using a pre-configured username and a pre-configured password. The user configuration parameters include, for example, a Service Set Identifier (SSID) of a fixed network AP saved by the STA module 202 according to the configuration management module 204. When the user selects the WAN2 to connect to the Internet, the wireless router is connected to a mobile network by using a modem module 203 by using dial-up parameters set by the user.

Step 4: A route module 205 of the wireless router forwards a packet according to a destination address of the packet.

Specifically, the route module 205 performs judgment according to an MAC address, and forwards the packet to a local network if a destination MAC address is in an MAC table, otherwise, sends the packet to an IP layer; the route module performs judgment according to a destination IP address on the IP layer, and sends the packet to a transmission layer for being processed, if the wireless router 20 is to be visited; or sends the IP data packet to a WAN interface if an external network is to be visited. The judgment according to the destination IP address on the IP layer includes: parsing the destination IP address of the data packet on the IP layer, and comparing the destination IP address with an IP address of the LAN interface of the router.

By using the preceding processing process, a user terminal may select a fixed network or a mobile network to access Internet by using the wireless router according to the embodiment of the present invention.

The wireless routing method according to the present invention solves the problem that a user cannot flexibly select a WLAN AP or a wireless modem to access Internet, and the user may access Internet at any place covered by a fixed network WLAN hot spot and a wireless network, thereby extending an access range of the user terminal. By using the method according to the embodiment of the present invention, the user may select a method with a lower fee to access the network, thereby reducing a fee on the user.

The preceding embodiments are provided for merely describing the technical solutions of the present invention, but not intended to limit the present invention. It should be understood by persons of ordinary skill in the art that although the present invention has been described in detail with reference to the embodiments, modifications can be made to the technical solutions described in the embodiments, or equivalent replacements can be made to some technical features in the technical solutions, as long as such modifications or replacements do not depart from the spirit and scope of the technical solutions according to the embodiments of the present invention.

What is claimed is:

1. A wireless router, comprising:
    a wireless Access Point (AP) module, connected to a terminal equipment through a wireless link, and configured to implement wireless access of the terminal equipment;
    a station (STA) module, connected to a wireless AP in a fixed network through a wireless link, and configured to connect the terminal equipment to the Internet by using the wireless AP;
    a wireless modem module, connected to an access device in a mobile network through a wireless link, and configured to connect the terminal equipment to the Internet by using the access device;
    a configuration management module, connected to the wireless AP module, and configured to receive a routing instruction from the terminal equipment, and in response thereto, select the wireless AP in the fixed network or the access device in the mobile network to connect the terminal equipment to the Internet according to the routing instruction;
    wherein when the wireless AP in the fixed network is selected to connect the terminal equipment to the Internet, the STA module is further configured to access a network of an operator in accordance with user configuration parameters; and
    when the access device in the mobile network is selected to connect the terminal equipment to the Internet, the wireless modem device is further configured to use dial-up parameters set by the user.

2. The wireless router according to claim 1, further comprising:
    a route module, configured to receive a packet from the terminal equipment or Internet, and route the packet from the terminal equipment to the Internet according to a destination address of the packet or route the packet from the Internet to the terminal equipment according to the destination address of the packet.

3. The wireless router according to claim 1, wherein
    the wireless AP module is connected to the terminal equipment by using a Local Area Network (LAN) interface;
    the STA module is connected to the wireless AP in the fixed network by using a first Wide Area Network (WAN) interface; and
    the wireless modem module is connected to the access device in the mobile network by using a second WAN interface.

4. A wireless routing method implemented by a wireless router, the method comprising:
    connecting to a terminal equipment through a wireless link, and providing wireless access service for the terminal equipment;
    connecting to a wireless Access Point (AP) in a fixed network through a wireless link, and connecting to an access device in a mobile network through a wireless link;
    receiving a routing instruction from the terminal equipment;
    in response to the received routing instruction from the terminal equipment, selecting the wireless AP in the fixed network or the access device in the mobile network to connect the terminal equipment to the Internet according to the routing instruction;
    wherein when the wireless AP in the fixed network is selected to connect the terminal equipment to the Internet, the method further comprises:
        accessing, by the STA module, a network of an operator in accordance with user configuration parameters; and
    when the access device in the mobile network is selected to connect the terminal equipment to the Internet, the method further comprises:
        using, by the wireless modem device, dial-up parameters set by the user.

5. A wireless routing system, comprising: a terminal equipment, a wireless router, a wireless Access Point (AP) in a fixed network, and an access device in a mobile network, wherein the terminal equipment is connected to the wireless router through a wireless link; and the wireless router is connected to the wireless AP in the fixed network through a wireless link and the access device in the mobile network through a wireless link;
    the wireless router is configured to connect to the terminal equipment through a wireless link, for providing a wireless access service for the terminal equipment;
    the terminal equipment is configured to send a routing instruction to the wireless router;
    the wireless router is further configured to receive the routing instruction from the terminal equipment, and in response thereto, select the wireless AP in the fixed network or the access device in the mobile network to connect the terminal equipment to the Internet according to the routing instruction;
    when the wireless AP in the fixed network is selected to connect the terminal equipment to the Internet, the STA module is further configured to access a network of an operator in accordance with user configuration parameters; and when the access device in the mobile network is selected to connect the terminal equipment to the Internet, the wireless modem device is further configured to use dial-up parameters set by the user.

6. The wireless routing system according to claim 5, wherein the wireless router is further configured to receive a packet from the terminal equipment or the Internet, and route the packet from the terminal equipment to the Internet or route the packet from the Internet to the terminal equipment according to a destination address of the packet.

* * * * *